United States Patent

Vogler et al.

[11] Patent Number: 6,132,876
[45] Date of Patent: Oct. 17, 2000

[54] CARBON BLACK PELLETS AND A PROCESS FOR THE PRODUCTION THEREOF

[75] Inventors: Conny Vogler, Bornheim-Sechtern; Karl Vogel, Alzenau; Udo Wieschnowsky, Kerpen-Brüggen; Jan Kopietz, Fröndenberg, all of Germany

[73] Assignee: Degussa Aktiengesellscaft, Frankfurt, Germany

[21] Appl. No.: 09/212,272

[22] Filed: Dec. 16, 1998

[30] Foreign Application Priority Data

Dec. 18, 1997 [DE] Germany .............................. 197 56 501
Dec. 19, 1997 [DE] Germany .............................. 197 56 501

[51] Int. Cl.$^7$ ........................................................ B32B 9/00
[52] U.S. Cl. ................................. 428/408; 428/688; 264/7
[58] Field of Search ..................... 428/408, 688; 264/7

[56] References Cited

U.S. PATENT DOCUMENTS 4,075,160 2/1978 Mills et al. .......................... 260/42.47

FOREIGN PATENT DOCUMENTS

| 0360236 | 3/1990 | European Pat. Off. . |
| 0424896 | 5/1991 | European Pat. Off. . |
| WO 96/01875 | 1/1996 | WIPO . |
| WO 96/21698 | 7/1996 | WIPO . |

OTHER PUBLICATIONS

*Ullmann's Encyclopedia of Industrial Chemistry*, vol. A28 (1996), pp. 103–163 (please note the discussion on p. 8 of the instant U.S. application text).

*Primary Examiner*—Deborah Jones
*Assistant Examiner*—Jason Resnick
*Attorney, Agent, or Firm*—Smith, Gambrell & Russell, LLP

[57] ABSTRACT

Carbon black pellets which can be produced by the addition of wax during dry granulation of carbon black powder. The carbon black pellets are distinguished by a pellet hardness of at least 0.15 N with a wax content of less than 10 wt. %, based on the total weight of the carbon black pellets.

12 Claims, 2 Drawing Sheets

CARBON BLACK PELLETS AND A PROCESS FOR THE PRODUCTION THEREOF

INTRODUCTION AND BACKGROUND

The present invention relates to carbon black pellets having good dispersibility and a high pellet hardness, and to a process for the production thereof.

In the processing of industrial carbon blacks it is preferred to use granulated products, which are frequently called carbon black granules, carbon black pellets or pelletized carbon black. At present, two different processes are used for the large-scale granulation or pelletization of carbon blacks: wet pelletization in a pelletizing machine with subsequent drying, and dry pelletization in a pelletizing drum. The two processes have markedly different process parameters, which are closely connected with the physical processes in the agglomeration in each case and with the resulting pellet properties.

The pelletizing machines used for wet granulation are granulators having a shaft with pins. They comprise a stationary tube (also called a "stator" below) which is arranged in a horizontal position and has a shaft with pins which rotates therein. The pelletizing chamber available for the purpose of granulation is located between the axis of the shaft and the wall of the tube. In the pelletizing chamber, the carbon black is conveyed by the pins of the rotating shaft from the inlet at one end of the tube to the outlet at the other end of the tube, during which agglomeration takes place as the carbon black rolls off the stationary tube wall. The residence time of the carbon black in the pelletizing machine may be lengthened by providing a baffle plate at the outlet or by raising the outlet relative to the inlet. Typical pelletizing machines have a length of from 1 to 3.5 meters and a diameter of from 200 to 760 mm.

In the pelletizing machine, the powdered industrial carbon black is mixed intimately with water, optionally with the addition of a binder. Depending upon the type of carbon black, in the case of water contents of from 40 to 60 wt. %, based on the total weight, spherical carbon black pellets are obtained. The moist pellets are subsequently dried in a further process step.

In the case of wet pelletization, agglomeration takes place by means of liquid bridges and capillary forces between the carbon black particles. The size of the capillary forces permits comparatively high circumferential speeds of from 10 to 20 m/s at the tips of the pins, producing intimate mixing and the subsequent formation of pellets.

In the case of wet pelletization, the necessary residence time for good formation of carbon black pellets is in the region of a few seconds, usually less than 20 seconds. The residence time can be lengthened to the range of several minutes by means of a baffle plate or by raising the outlet relative to the inlet.

Without the use of binders, the achievable pellet hardness of the carbon black pellets obtained by means of wet pelletization is in the range of from 0.1 to 0.3 N in the case of pellet diameters of from 1.4 to 1.7 mm. In order to increase the pellet hardness, a soluble, solid substance (pelletizing agents) is added to the pelletizing water and remains in the carbon black pellets after drying. As a result of the intensive wetting of the carbon black and the homogeneous dissolution of the pelletizing agent in the pelletizing water, the pelletizing agent is distributed in optimum manner and is able to fully develop its strengthening action.

For dry pelletization there are used pelletizing drums comprising a rotating tube which is likewise arranged in a horizontal position. The interior of the tube is called the pelletizing chamber. For the purpose of granulation, the powdered industrial carbon black is pre-densified, for example in accordance with DE 38 32 404, and granulated in the pelletizing drum by rolling off the rotating tube wall. The Van-Der-Waals and electrostatic forces responsible for dry pelletization are considerably lower than the capillary forces which are at work in the case of wet pelletization. The granulation must be carried out in a correspondingly gentle manner. The circumferential speed of the pelletizing drum is, therefore, only from 1 to 2 m/s. With markedly higher circumferential speeds, the rolling-off movement does not occur because of the high centrifugal force. Furthermore, the force acting on the pellets that are forming is so high that they are immediately destroyed again. The achievable pellet hardness is usually less than 0.1 N in the case of pellet diameters of from 1.4 to 1.7 mm.

On account of the low Van-Der-Waals forces it is necessary, in order to initiate granulation, to add granulation seeds in the form of pre-densified carbon black to the carbon black. The seeds are introduced into the pelletizing drum before the beginning or are fed in continuously during operation of the pelletizing drum in an amount of from 1 to 30 wt. %, based on the amount of carbon black powder. If granulation seeds are not added, dry granulation may not take place or the pellets may break.

The typical residence time of the carbon black in the dry pelletizing drum is from 1 to 4 hours. In order to ensure an adequate carbon black throughput (in kg/h), dry pelletizing drums must be considerably larger than pelletizing machines for wet pelletization. Dry pelletizing drums having diameters of 2 m and lengths of 18 m are used in production. The filling amounts of such drums are several tons. In contrast, the filling amounts of pelletizing machines are only a few kilograms.

In both wet and dry pelletization it is possible to use additives to increase the pellet hardness and/or improve the dispersibility.

On account of their greater pellet hardness, wet-pelletized carbon blacks generally also have a greater dispersion hardness than dry-granulated carbon blacks. Accordingly, they are used mainly in the rubber industry. The wet-granulated carbon blacks are readily dispersible in the highly viscous rubber compositions. Their high pellet hardness allows them to be transported easily in pneumatic conveyor apparatuses.

Dry-pelletized carbon blacks are used principally as pigments in paints and plastics. However, carbon black powders are still used in large amounts in those fields, and their handling can lead to a high degree of dust irritation in the workplace. That dust irritation can be reduced only by the use of pelletized carbon blacks.

WO 96/01875 describes the use of organic compounds to produce carbon black pellets which are resistant to abrasion and are readily dispersible. Suitable organic compounds are non-polymeric organic compounds, thermoplastic homopolymers, thermoplastic copolymers, or a wax. Those substances are added to the carbon black in amounts of from 10 to 48 wt. % during pelletization. Pelletization may be carried out in pelletizing machines and in pelletizing drums. According to that specification, pelletization takes place in a manner similar to that of wet pelletization by strengthening of the cohesive forces between the carbon black particles as a result of the molten organic substances. Accordingly, when pelletizing machines are used they are operated using the same process parameters as in conventional wet pelletization. According to WO 96/01875, if the organic substances are not added, carbon black pellets are not obtained. In the case of pelletization in a pelletizing machine having a shaft with pins, the minimum amount of organic substances to be added, depending upon the DBP value of the carbon black powder, is approximately 29 wt. % but typically 38.5 wt. %. According to the WO specification, the addition of the organic substances to the carbon black is carried out, for example, by atomization with the aid of a pressure nozzle.

WO 96/21698 describes the wet pelletization of carbon black in a pelletizing machine with the aid of an aqueous solution of an organic binder. In order to remove the water, the carbon black pellets that are formed must be dried at temperatures at which the organic binder does not decompose. The amount of binder contained in the dried carbon black pellets is from 0.1 to 50 wt. %.

An object of the present invention is to improve the properties of carbon black pellets to enhance their usefulness and which can be produced with a low energy consumption.

Another object of the present invention is to increase the hardness of the carbon black pellets while at the same time having good dispersion behavior, and with only a low dust content.

SUMMARY OF THE INVENTION

The above and other objects of the invention can be achieved by carbon black pellets which comprise at least one natural and/or synthetic wax and which have been obtained by pelletizing a powdered starting carbon black. The carbon black pellets are characterized in that their wax content is from 1 to less than 10 wt. %, based on their total weight, and in that their individual pellet hardness is greater than 0.15 N.

The carbon black pellets according to the invention may advantageously be used as fillers in rubber and plastics articles and as pigments for the production of printing inks. On account of their advantageous pellet hardness they are distinguished by good transportation and metering properties and can readily be dispersed again.

BRIEF DESCRIPTION OF THE DRAWINGS

The present invention will be further understood with reference to the drawings, wherein.

DETAILED DESCRIPTION OF THE INVENTION

Figure 1:
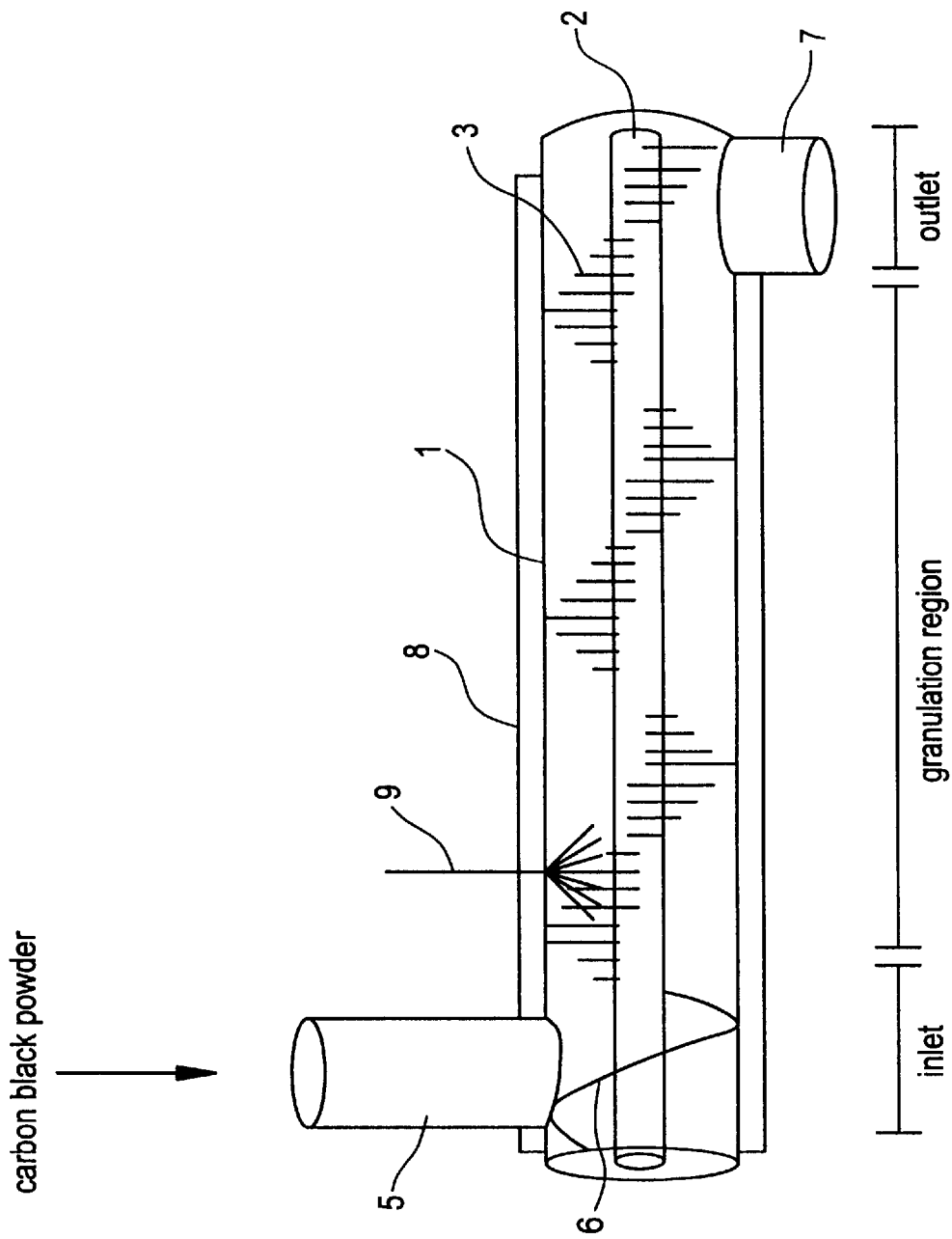
FIG. 1 is a schematic representation of a granulator having a shaft with pins for the production of the carbon black pellets according to the invention.

The waxes used for the production of the carbon black may be of both natural and synthetic origin. A good overview of the waxes that are suitable according to the invention will be found in Ullmann's Encyclopedia of Industrial Chemistry, Vol. A28, pages 103 to 163, 1996, which is relied on and incorporated herein by reference. Preferably waxes are used which are in any case required for the production of the finished products into which the carbon black pellets are to be incorporated. In this connection, the low wax content of the carbon black pellets of less than 10 wt. % has been found to be advantageous as compared with the wax-containing carbon black pellets known from the prior art. The amount of wax introduced into the finished product by the carbon black pellets can, therefore, generally be kept lower than the wax content required in the finished product. As a result, freedom regarding the wax content in the finished product is scarcely restricted by the carbon black pellets.

The starting carbon black for the carbon black pellets according to the invention can be selected from a wide range of known carbon blacks, depending upon the application requirements. For example, the DBP adsorption of the starting carbon black may vary in a range of from 40 to 250 ml/g and its nitrogen surface may vary from 5 to 500 m$^2$/g.

The carbon black according to the invention is preferably produced by dry pelletization in a pelletizing machine as is normally employed in wet pelletization. In order for dry pelletization to be possible in a pelletizing machine, the operating parameters must be suitably adapted to the requirements of dry pelletization.

In wet pelletization, high rotational speeds of the shaft of more than 500 min$^{-1}$ are used, resulting in a circumferential speed of the pin tips of from 10 to 20 m/s. High forces act on the carbon black as a result and prevent the formation of pellets if an attempt at dry pelletization of the carbon black is made.

For the production of the carbon black pellets according to the invention, the rotational speed of the shaft is so reduced that the circumferential speed of the pin tips assumes values of from 1 to 6 m/s. It has been found that, in that case, spontaneous agglomeration of the carbon black already begins without the addition of liquid or pelletizing agents, if the average residence time of the carbon black in the pelletizing machine is adjusted to a value of from 20 to 600 seconds.

The spontaneous agglomeration of the starting carbon black is increased by the addition of molten wax or a molten wax mixture. The addition of the wax makes it necessary to heat the entire pelletizing machine to a temperature that is from 10 to 20% above the melting temperature of the wax in question, in order to prevent the carbon black from adhering to the walls and components of the pelletizing machine.

The nature of the addition of the wax has a great influence on the quality of the finished carbon black pellets. It has been found that the desired pellet hardness of greater than 0.15 N can be achieved with a content in the finished carbon black pellets of less than 10 wt. % only if the wax is atomized over the powdered starting carbon black very finely with an average droplet size of less than 50 μm. If the average droplet size is larger, the wax is not distributed sufficiently homogeneously in the carbon black, with the result that a higher wax content is necessary to achieve a given pellet hardness. By the term "less than 10 wt %" herein is meant a value in the range of 9.5 to 9.9 wt. % and more particularly up to 9.9% by weight.

For the purpose of atomization, the wax is first melted by heating to a temperature that is from 10 to 20% above its melting temperature, and is then conveyed to a spray nozzle. Experiments with mechanical atomization of the wax at a pressure of 6 bar did not produce satisfactory results. The average droplet sizes achieved thereby were greater than 100 μm. In that case, a pellet hardness of greater than 0.15 N could only be obtained with wax contents in the carbon black pellets of more than 20 wt. %. Atomization of the wax by means of a binary nozzle has proved suitable for the purposes of the invention. Average droplet sizes of approximately 20 μm were obtained by atomization of the wax with compressed air at 6 bar.

In addition to the nature of the atomization of the wax, the point at which the atomization is effected is also of considerable influence on the quality of the carbon black pellets that are forming. As already mentioned at the beginning, a pelletizing machine comprises a stationary tube (stator) which is arranged in a horizontal position and has a shaft rotating therein. The pelletizing machine usually has an inlet region in which the powdered starting carbon black is fed to the pelletizing machine. In that region there is located a screw conveyor, which imparts to the carbon black that is fed in a movement component in the axial direction. The inlet region is followed by the actual granulation region, in which the carbon black agglomerates by the mechanical action of the rotating pins and by rolling off the inner wall of the stator. After leaving the granulation region, the carbon black, which is already in the form of pellets, passes into the outlet region and is continuously discharged from the pelletizing machine.

Depending upon the construction of the pelletizing machine, the individual regions of the pelletizing machine may be of different sizes. In any case, the inlet and outlet regions should be kept as small as possible in favor of the granulation region. Once the powdered starting carbon black has entered the granulation region, agglomeration of the carbon black begins and is complete at the end of that region. In order for the wax to be distributed as homogeneously as possible over the entire cross-section of the carbon black pellets, it is necessary to atomize the wax over the carbon black in the first third of the granulation region. Introduction of the wax at a later stage of pellet formation leads to an inhomogeneous structure of the carbon black pellets and hence to reduced pellet hardness.

A further improvement in the homogeneity of the mixing of the wax into the carbon black is obtained if there are used for the atomization several spray nozzles which are distributed in a plane perpendicular to the shaft at the periphery of the stator. The number of nozzles is advantageously limited to from two to five. The nozzles are arranged in a plane perpendicular to the shaft in order to ensure that the mixing is homogeneous. If the spray nozzles were offset axially, the wax from the different nozzles would be mixed into the carbon black at different stages in the agglomeration.

As mentioned above, the preferred residence time of the carbon black in the pelletizing machine is from 20 to 600 seconds. The average residence time $\bar{t}$ is linked with the throughput $\dot{m}$ and the filling amount $m_f$ of the pelletizing machine via the following equation:

$$\dot{m} = m_f / \bar{t}$$

The throughput of a pelletizing machine is considerably greater than the throughput of a pelletizing drum, while the pelletizing chambers are comparable in size. The reason for that is the considerably shorter residence time of the pellet material in the pelletizing machine. It is surprising that spontaneous agglomeration of the carbon blacks begins in the granulator despite the short residence times. That is made possible by selecting operating parameters (residence time and circumferential speed of the tips of the pins) which are unusual for normal operation of the pelletizing machine in the case of wet granulation.

The carbon black powder is usually fed to the granulation region of the pelletizing machine by means of a screw conveyor. The carbon black throughput of the pelletizing machine is, therefore, equal to the conveyor speed of the screw conveyor and can thus be adjusted within wide limits.

The filling amount and the residence time can be increased by raising the outlet region relative to the inlet region. The resulting angle between the axis of the pelletizing machine and the horizontal may be adjusted to approximately from 0 to 15°.

The filling amount and the residence time are also influenced by the rotational speed of the shaft. With a constant supply of carbon black (constant carbon black throughput), the filling amount and the residence time fall proportionally to each other as the speed increases.

The preferred residence times for the production of the carbon black pellets according to the invention are in the range of from 20 to 180 seconds. Below 20 seconds, the agglomeration process is not sufficiently advanced and the carbon black pellets therefore still contain a high proportion of fine particles of more than 20%. Residence times of more than 600 seconds are usually possible only with low carbon black throughputs because of the upper limit on the filling amount.

It is in principle possible to pelletize any type of carbon black using the described production process. It has been found that carbon blacks having a low specific surface and a low structure can readily be pelletized. Carbon blacks having a high specific surface and a high structure can readily be pelletized, too. In contrast, carbon blacks having a high specific surface and a low structure and carbon blacks having a low specific surface and a high structure are difficult to granulate. In order to initiate agglomeration it is, therefore, advantageous to mix with the carbon black powder carbon black pellets as agglomeration seeds (also called granulation seeds). Carbon black pellets of the same type of carbon black as that which is to be pelletized are preferably used. Depending upon the pelletizing properties of the carbon black, there may be added thereto up to 50 wt. % of carbon black pellets. Preferably, the carbon black pellets are added to the carbon black powder in an amount of from 5 to 15 wt. %. In the case of types of carbon black which can readily be pelletized, the addition of carbon black pellets may be omitted altogether or may be stopped shortly after granulation begins. In any case, however, the addition of the wax has a positive effect on the pelletization.

A further improvement in pelletization can be achieved if the carbon black powder is pre-densified to pour densities in the range of from 150 to 300 g/l before it is fed to the pelletizing machine. Pre-densification may be carried out in a known manner, for example, with the aid of vacuum filter rolls.

The present invention is described below with reference to some examples.

The carbon black pellets according to the invention can be produced using a pelletizing machine. The construction of such a pelletizing machine is shown diagrammatically in FIG. 1. The pelletizing machine comprises a stationary tube 1, the stator, which is arranged in a horizontal position, and a rotating shaft 2 which is arranged axially therein and has pins 3 arranged in the form of a helix. Between the shaft 2 and the stator 1 there is located the pelletizing chamber of the pelletizing machine. The carbon black powder is fed to the granulator at the inlet 5. In the region of the inlet, the shaft has a screw conveyor 6 which conveys the carbon black powder in the axial direction to the outlet 7. The stator 1 is of double-walled construction and allows the temperature of the stator wall to be controlled by means of a liquid 8. In the first third of the granulation region of the stator, its upper side is provided with through-holes, through which spray nozzles 9 for the addition of the wax are introduced.

Figure 2:
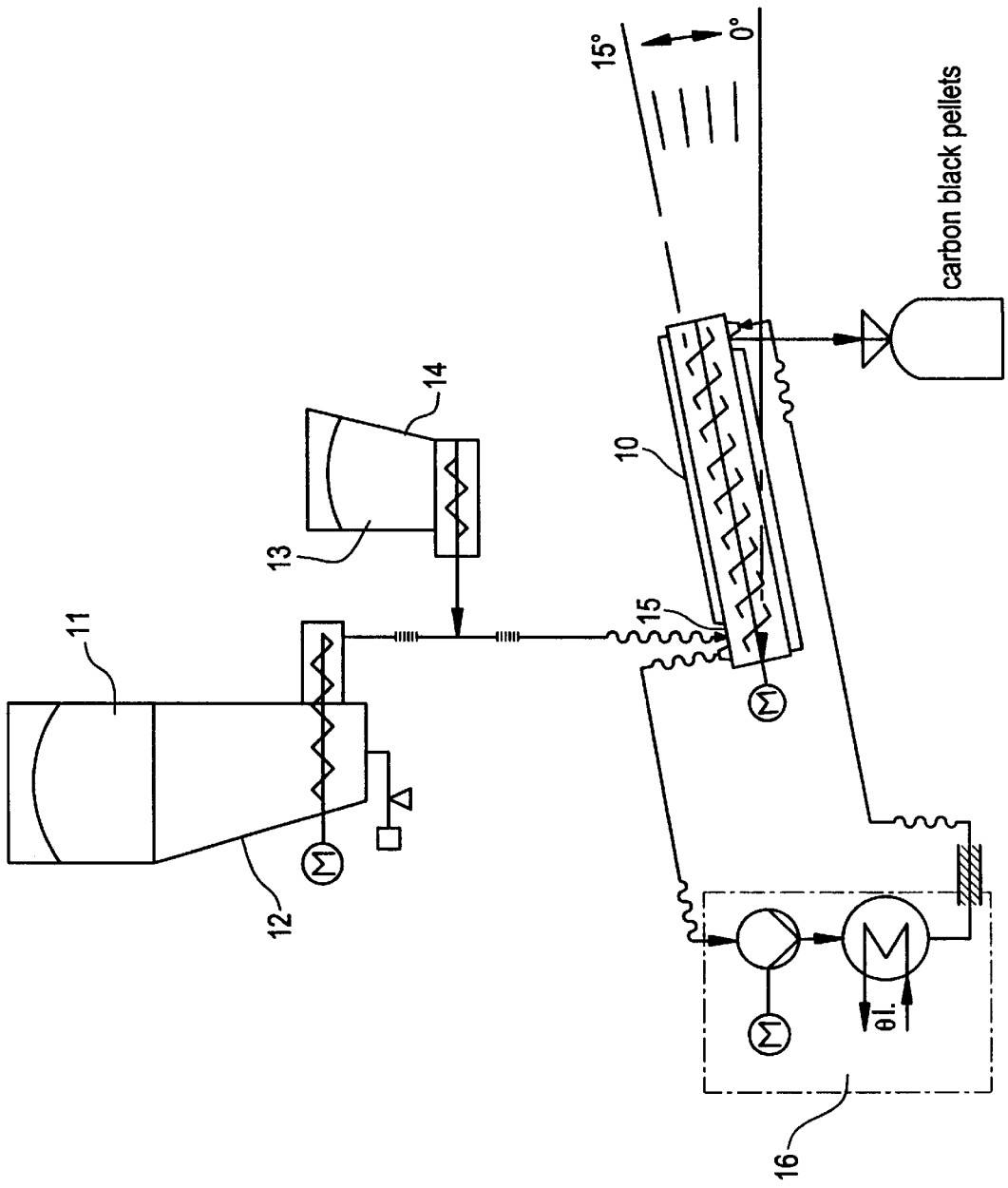
FIG. 2 is a schematic representation of a flow chart for the process for the production of the carbon black pellets according to the invention.

FIG. 2 shows the flow chart for the process for the production of the carbon black pellets according to the invention. In order to adjust the residence time, the pelletizing machine 10 can be inclined with its axis by an angle of inclination of from 0 to 15° to the horizontal. To that end, the outlet of the pelletizing machine is raised correspondingly relative to the inlet. Carbon black powder 11 and, optionally, granulation seeds 13 are fed from the storage containers 12 and 14 to the inlet 15 of the pelletizing machine 10. The stator of the pelletizing machine is adjusted to a desired temperature by means of the thermostat 16.

Further variations and modifications of the foregoing will be apparent to those skilled in the art and are intended to be encompassed by the claims appended hereto.

German priority application 197 56 501.8 is relied on and incorporated herein by reference.

We claim:

1. Carbon black pellets, comprising: carbon black; and at least one natural or synthetic wax, the carbon black pellets having a wax content of from 1 to less than 10 wt. %, based on a total weight of the carbon black pellets, wherein individual carbon black pellets have a hardness of greater than 0.15 N, and wherein the carbon black pellets are produced by pelletizing a powdered starting carbon black.

2. The carbon black pellets according to claim 1, wherein the starting carbon black has a DBP adsorption of from 40 to 250 ml/100 g and a nitrogen surface of from 5 to 500 $m^2/g$.

3. The carbon black pellets according to claim 2, wherein the wax is a member selected from the group consisting of one or more paraffin waxes.

4. A process for continuous production of carbon black pellets according to claim 1, comprising: feeding carbon black powder into an inlet region of a pelletizing machine having a shaft with pins, the pelletizing machine further having a granulation region and an outlet region; adding a molten wax or a molten wax mixture to the pelletizing machine by atomizing said wax or wax mixture in a first third of the granulation region over the carbon black, which is still in powder form, wherein the atomized molten wax or molten wax mixture has an average droplet size not exceeding 50 $\mu$m, wherein a maximum circumferential speed of tips of the pin is from 1 to 6 m/s, and wherein an average residence time of the carbon black in the pelletizing machine is from 20 to 600 seconds; and continuously removing pelletized carbon black at the outlet region of the pelletizing machine.

5. The process according to claim 4, wherein the wax mixture is atomized over the carbon black, through 2 to 5 nozzles, the nozzles being arranged in a plane perpendicular to an axis of the shaft.

6. The process according to claim 5, wherein up to 50 wt. % of pre-densified carbon black is mixed with the carbon black powder as granulation seeds.

7. The process according to claim 5, wherein 5 to 30 wt. % of pre-densified carbon black is mixed with the carbon black powder as granulation seeds.

8. The process according to claim 5, further comprising pre-densifying the carbon black powder to a pour density of from 150 to 300 g/l before granulation.

9. The process according to claim 4, wherein no liquid is added to the pelletizing machine other than the molten wax or molten wax mixture.

10. The process according to claim 4, further comprising heating said pelletizing machine to a temperature from 10 to 20% above a melting temperature of the wax or wax mixture.

11. The process according to claim 4, further comprising atomizing said wax or wax mixture with compressed air.

12. The process according to claim 4, further comprising atomizing said wax or wax mixture from a plurality of nozzles arranged in a plane perpendicular to said shaft to obtain homogeneous mixing of wax and carbon black.

* * * * *